Nov. 11, 1930.　　　F. CREEDY　　　1,781,538
DYNAMO ELECTRIC MACHINE
Filed Nov. 9, 1925　　　6 Sheets-Sheet 1

Inventor
F. Creedy.

Nov. 11, 1930.  F. CREEDY  1,781,538
DYNAMO ELECTRIC MACHINE
Filed Nov. 9, 1925    6 Sheets-Sheet 2

Nov. 11, 1930.   F. CREEDY   1,781,538
DYNAMO ELECTRIC MACHINE
Filed Nov. 9, 1925   6 Sheets-Sheet 5

Witnesses
S. H. West
S. D. Frost

Inventor
F. Creedy

Patented Nov. 11, 1930

1,781,538

UNITED STATES PATENT OFFICE

FREDERICK CREEDY, OF LONDON, ENGLAND

DYNAMO-ELECTRIC MACHINE

Application filed November 9, 1925, Serial No. 67,772, and in Great Britain November 21, 1924.

The present invention relates to improvements in the type of dynamo electric machine in which two magnetic fluxes having different pole numbers co-exist in the same core and has for one of its objects the provision of improved types of windings capable in certain cases of connection to a commutator and rendering such a machine adaptable to a variety of purposes more fully described below. Such machines will carry on the stationary member two windings adapted to different pole numbers, the one connected to an alternating current supply called the first A. C. supply and the other, for instance, to a second independent circuit or supply. The revolving member carries a single winding which is short circuited on one pole number and connected to a commutator on the other, or two windings one short circuited and adapted to co-operate with one pole number and the other adapted to co-operate with the other. If the pole number of the short circuited winding corresponds to that of the winding carrying the first alternating current supply the machine will run on that pole number with the characteristics of an induction motor with short circuited rotor. If the winding is connected to a commutator in such a way as to cut the field due to the second stator winding just referred to which is excited from the second supply, an E. M. F. will appear on the commutator of the frequency of the second supply and the machine will operate as a converter capable of transforming electric power from an A. C. supply of any voltage, phase or frequency, to electric power of another form in a single machine.

In certain cases the two stator windings may be combined in one which carries electric power in two distinct forms. It will be convenient in many cases to describe the construction of the machine on the assumption that the second circuit requires only two line wires.

It may be pointed out that even if the windings of the two pole numbers on the rotor are not arranged so as to be incapable of mutual induction, yet since the rotor winding is short circuited on one pole number the voltage across it when running at full speed must be nearly zero on that pole number, having in fact only a very small value corresponding to the resistance drop in the short circuited coil. This will be negligibly small as compared to the E. M. F. across the brushes and in most cases will not be objectionable.

In the accompanying drawings:—

Figure 1:
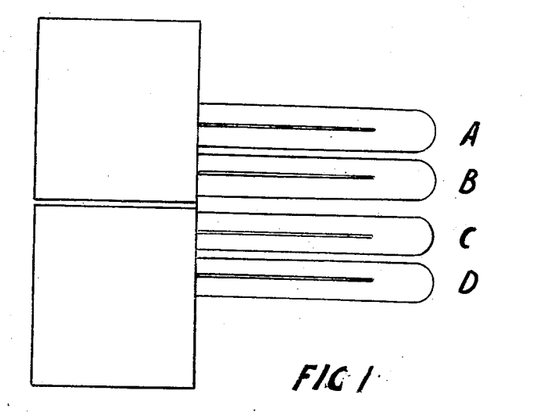
Figure 1 is a diagram illustrating the arrangement of the second and first windings in such a machine for the case in which there are two windings on each member.

In the most general case then the machine may carry two windings on either member which are shown in Figure 1 and lettered A, B, C and D. Two of these windings will be arranged to carry the currents flowing in the second circuit and the remaining two to carry the first alternating current. Windings B and C will usually be the first alternating current windings and windings A and D the windings associated with the second circuit.

Figure 2:
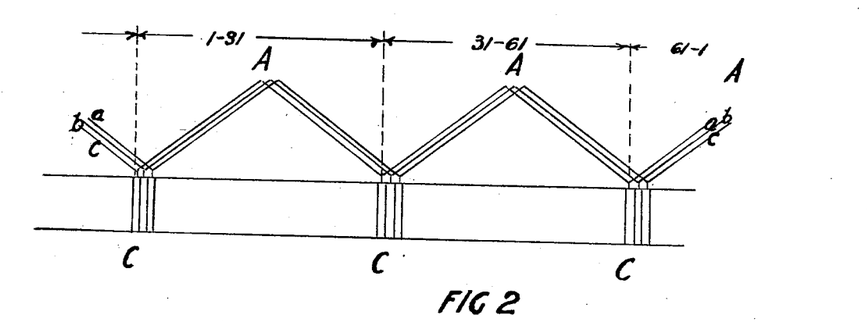
Figure 2 shows an arrangement of equalizer connections for an example of the invention in which the first and second windings are arranged for two and six poles respectively.

As an example of the invention I may first describe a combination arranged for two and six poles having say a two pole first alternating current winding on the stator and six pole second winding on the rotor. In this case the rotor may simply be wound with a six pole "direct current" multiple circuit winding of the usual type connected to the commutator in the ordinary way, this winding being fitted with equalizers A, A, A, as shown in Figure 2, connecting points on the commutator one-third of the circumference apart. Such points are at the same potential on the six pole field but at different potentials on the two pole field. The currents induced by the two pole stator winding will flow through the rotor winding, their circuits being closed by the equalizers and will not appear on the commutator when the machine is running at full speed. The arrangement of these equalizers is shown in Figure 2 C, C, C representing the commutator segments and A, A, A the connections between them, for the case of a rotor winding having say 30 slots and 90 commutator segments. In this case an equalizer ring may be connected to segments 1, 31 and 61 other rings being connected to other segments spaced apart by the same amount.

If the pitch of the windings were made slot one to slot sixteen, that is half the circumference it would represent full pitch both for two pole and six pole windings, but this is not in any way necessary, windings of any pitch, except those in the neighbourhood of one-third of the circumference, being permissible.

Figure 4:
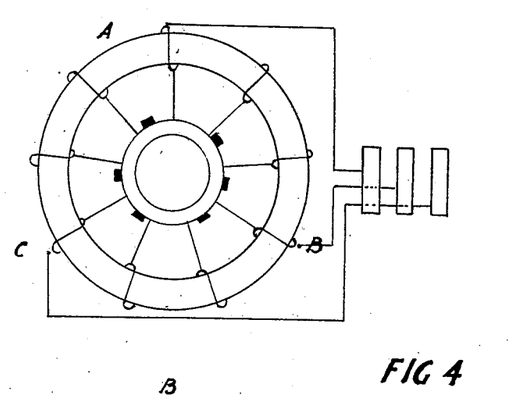
Figure 4 shows an arrangement of rotor winding for attachment both to a commutator and slip rings.

A modification of such a set which is sometimes useful is to omit the equalizer connections just referred to and substitute slip rings connected to points A, B and C one-third of the circumference apart as shown in Figure 4.

These slip rings will be at the same potential with respect to the six pole winding and hence no E. M. F. will be induced in them by the six pole field, neighbouring slip rings being exactly two pole pitches apart. If, however, direct current is fed into these slip rings, for instance, by short circuiting two of them and connecting a direct current exciter between the short circuited pair and the remaining ring, the set could operate as a synchronous motor on the two pole field and as a generator (for instance of low frequency alternating current) on the six pole field, or the slip rings may be used to start the machine in the usual manner.

In the windings just described windings C and D of Figure 1 are combined in one being represented by the winding attached to the commutator with equalizers or slip rings.

It remains to describe windings A and B, Figure 1. Winding B which may be supposed to be arranged single phase is diagrammatically illustrated in Figure 6 in which A, B, C and D indicates a coil lying in slots A and C, for the case in which the stator contains 24 slots. Such a winding will give a two pole field; the pitch of the coil is exactly one third of the circumference which renders it impossible for the winding to produce an harmonic having three or any multiple of three times the number of poles of the fundamental winding.

Figure 6:
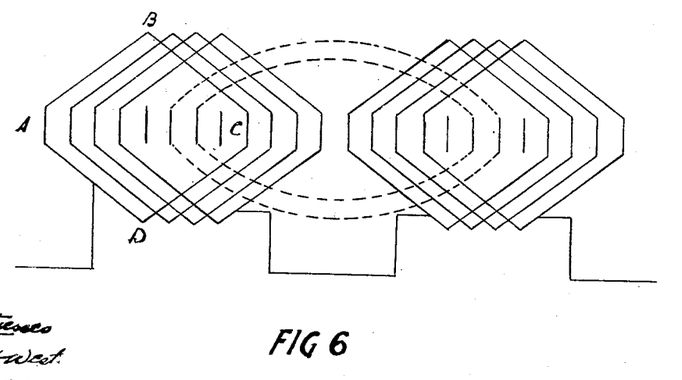
Figure 6 shows a suitable form of two pole single phase winding.

Since the winding is only arranged for a single phase, some form of starting winding is also required, and this of course can be wound into the empty slots in the centre of the main single phase winding. It is shown dotted in the figure and presents no difficulty in construction since its sole duty is to accelerate the machine up to its normal speed on no-load.

Coming now to the second stator winding it is of course necessary that it shall not receive induction from the first alternating current winding. This may be accomplished in general, for instance, by giving it a pitch equal to an even number of pole pairs of the first alternating current winding, but where the first alternating current winding has fewer poles than the second winding, as for instance, in the case of a two pole first alternating and six pole second winding, other means must sometimes be adopted. Such a means is by connecting a number of coils in series equal to the number of pole pairs of the second winding but since this may have a large number of turns, some precautions are necessary, since although the E. M. F.'s induced from the first winding might cancel out between the terminals, yet they might nevertheless give rise to dangerously high E. M. F.'s in certain parts of the windings. For this reason, it is desirable that these E. M. F.'s should not only cancel out in the windings as a whole but in each turn, or at any rate in each few turns. To accomplish this a convenient arrangement is to wind the coil of the second winding of sufficient length for each coil to enter as many slots as there are poles. For instance in Figure 3 the coil A, B, C, D, E, F enters six slots and is wound for six poles.

Owing to the fact that the air gap surface is continuous all round the circumference, it is practically necessary, except perhaps in the smallest sizes, to fit the machine with a neutralizing winding producing a number of ampere turns equal and opposite to that of the rotor. It is convenient, in fact, to give this neutralizing winding rather more ampere turns than the rotor winding, when it produces the effect of an interpole and field winding if the brushes are suitably placed.

Figure 3:
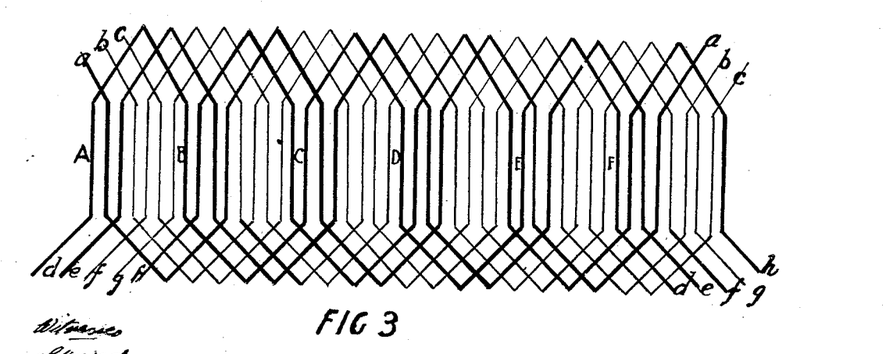
Figure 3 shows the arrangement of the second stator windings on such a machine.

A convenient arrangement for a two phase machine having two and six poles and forty-eight slots, is given in Figure 3. In this figure alternate pairs of coils, (each winding into six slots as A, B, C, D, E and F, for instance) belong to the two phase respectively, those belonging to one phase being shown in fine lines and to the other in black lines. This winding therefore is the equivalent of winding A, Figure 1; while the winding of Figure 6 is the equivalent of winding B. Or alternatively the heavy lines may denote the neutralizing winding and the light the field winding of any machine adapted to any supply requiring only two line wires.

Figure 5:
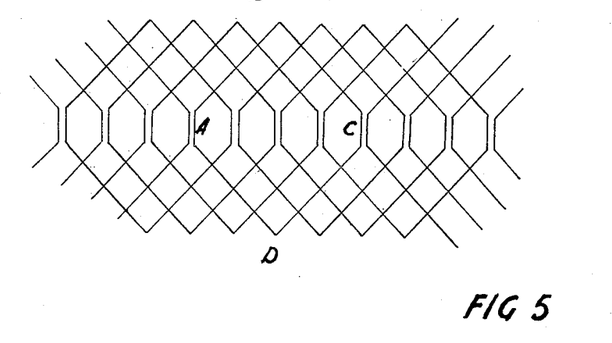
Figure 5 shows a suitable arrangement of short circuited rotor winding for use when the commutator winding is arranged for a multiple of six poles.

In the rotor winding already described for the case of two and six poles it is possible for a small E. M. F. induced by the first winding to appear across the commutator during the starting period when the slip between the rotor winding and the alternating flux is considerable. In certain cases it may be desirable to avoid entirely any mutual induction between the first and second windings. In order to do this it will no longer be convenient to combine windings C and D, Figure 1 into a single winding. Instead of this winding C, the alternating current winding may take the form shown diagrammatically in Figure 5 for the case of twelve slots, that is, winding C takes the form of a number of turns such as A, B, C, D lying in slots A and C and each covering exactly one third of the circumference, each being short circuited on itself. The second winding D (Fig. 1) may in this case conveniently be made of the two circuit type there being three coils in series equidistant round the circumference between each pair of commutator segments. A balanced series of polyphase E. M. F.'s will be induced in these three coils by the two pole field which will sum up to zero and hence this field could produce no E. M. F. whatsoever between adjacent sections and therefore none in the windings as a whole. Thus, by this means the first and second alternating current rotor windings are made completely free from mutual induction.

In the machine so far described it has been assumed that the first alternating current winding is arranged for two poles and the second winding for six poles. A modification of this may be constructed in which the first alternating current winding is arranged for six poles and the second winding for two poles. In this case it will not be convenient to combine windings C and D, Figure 1, but they may be made separate as in the last example.

The six pole alternating current rotor winding or winding C may now be arranged in the same way as the six pole stator winding was previously arranged, namely, as shown in Figure 3 for the case of forty-eight slots. In this case of course instead of each slot containing a large number of conductors it would only contain a single bar there being eight sets of six bars in series each set of six bars being short circuited on itself.

In the case we are now considering where the winding attached to the commutator is arranged for two poles, it must be made with a pitch exactly equal to one-third of the circumference in order to render it free from mutual induction with the six pole alternating current winding.

Coming now to the stator winding, Figure 6 may illustrate a two pole winding for such a machine, the dotted starting winding being no longer required. The pitch will be as before, exactly one-third of the circumference in order to render it free from mutual induction with the six pole alternating current winding.

It is convenient in many cases for the purpose of raising the efficiency to combine the windings A, B of the rotor and the windings C, D of the stator member. On the stator certain windings are already known which are capable of being excited with polyphase current on one pole number and with any current requiring only two line wires on another. For instance, a winding is known which may be connected for eight poles as a three phase star winding, in two parallels; direct current or single phase alternating current being fed in between the star points to produce a four pole field or the winding may be arranged to give a four pole alternating field and an eight pole direct current or single phase field. Such a winding may be employed in a machine with the appropriate pole numbers, the direct current or single phase excitation being used to provide the neutralizing ampere turns and there being in addition a further field winding.

Figure 7:
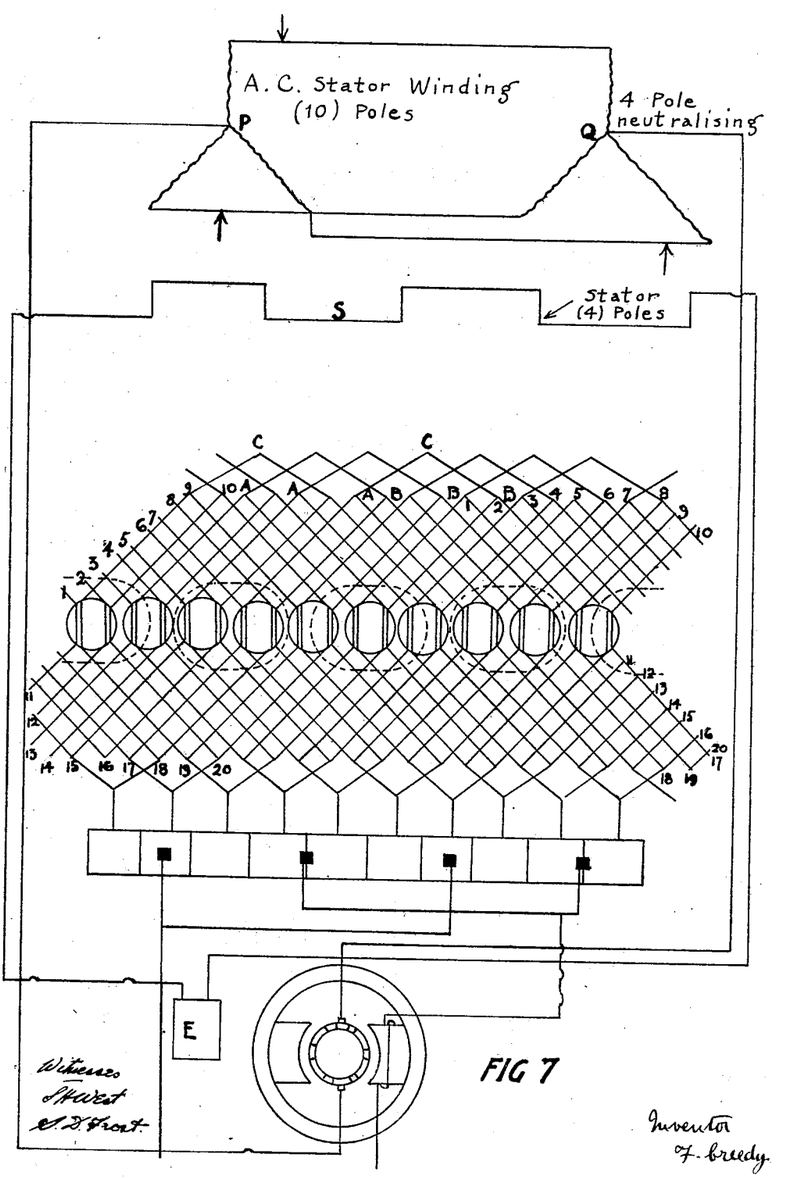
Figure 7 shows a complete embodiment of the invention including a single rotor winding which is short circuited on ten poles and capable of attachment to a commutator on four poles, a three phase stator winding arranged for ten poles and adapted to carry single phase alternating current giving a four pole distribution arranged to neutralize the ampere turns of the rotor, a four pole shunt winding also on the stator and a separate exciter direct current adapted to produce the direct current excitation of the stator winding.
Figure 8:
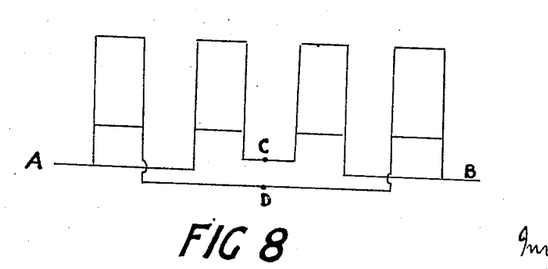
Figure 8 shows a stator winding adapted for single phase excitation on eight poles and single phase of different frequency on four poles.
Figure 9:
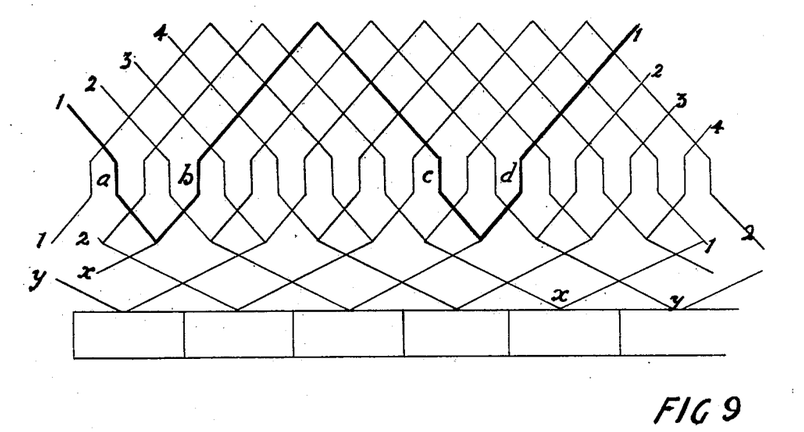
Figure 9 shows a further example of combined rotor windings.

Such a winding when combined with a rotor winding of the type shown in Figure 7 or Figure 9 but arranged for eight and four poles provides a converter of the type described having only a single winding on both members except for the existance of the field winding on the stator. Other windings of a similar type can be arranged for many other combinations than eight and four poles, for instance, six and two, ten and four poles, among others. Some of these are described with reference to Figures 10, 11 and 12. The star winding P, Q of Figure 7 therefore may be considered to be of this class arranged for say ten and four poles.

The rotor windings shown in Figure 7 are of a type which operates as a short circuited winding on one pole number and may be attached to a commutator across which E. M. F.'s will appear due to a field of another pole number. A simple example of such a winding is shown which may be supposed to be wound into ten slots each slot containing four conductors. The conductors in each slot are shown by vertical lines, the slots themselves being indicated by a row of ten circles each circle including four vertical lines or conductors. This winding is capable of acting as a short circuited winding on any odd number of pole pairs, for instance two, six or ten poles. It consists of twenty coils each short circuited upon itself and lying in slots spaced apart by half the circumference, that is, spaced apart by an even number of pole pitches of the four pole flux. Each short circuited coil may consist of two bars one at the top of one slot and one at the bottom of another slot joined together at their extremities where a clip or knuckle is frequently formed as at A or B; A or B; A or B. These clips themselves are joined in a further sequence by a further set of end connections such as A, B, C, Figure 7, with the result that they make up a regular drum type of winding adapted for a different pole number which in the case given will be four poles.

Considered from the point of view of this second or four pole winding alternate clips for instance those marked A correspond to a single bar (say the "top" bar) of an ordinary winding while the remaining alternate clips for instance those marked B correspond to another single bar (say the "bottom" bar) of an ordinary winding. From this point of view the only distinction between the winding of Figure 7 and a winding of the ordinary type is that the single bar of the ordinary winding is now split into two bars in parallel placed diametrically opposite one another on the circumference. If the winding is regarded from this point of view no difficulty will be experienced in understanding its nature. In general, of course, these two bars need not be opposite but must span an even number of pole pitches of the flux which induces the E. M. F. appearing across the brushes.

In many cases it is inconvenient to excite the windings on the stator from the commutator, particularly if this is arranged for high voltage, since where the neutralizing winding is also used to carry the alternating current, the number of turns in it is determined by the requirements of the latter and hence cannot be adjusted to give the same ampere turns as the armature, and thus cannot be adapted to its requirements if placed directly in series with the commutator. Again, the disadvantages of a large number of turns in the field winding have already been pointed out and it may be desirable to obviate these by winding it for a very low voltage. For these reasons the second stator winding may preferably be energized from separate exciters instead of from the commutator the neutralizing winding from an exciter whose field windings are in series with the commutator and the shunt winding from a small shunt exciter. By winding this exciter for an appropriate voltage the number of turns on the neutralizing winding may be adapted to the requirements of the alternating current and the number of turns on the field may be kept low. Alternatively, where separate windings are employed it is possible by this means to reduce them to a very simple form having only one or two bars per slot.

The exciter of Figure 7 has its series coil connected in series with the commutator and its series brushes connected between the star points P and Q of the stator winding. The main field coils are connected across the exciter E.

It has been pointed out above how by making the alternating current winding of a certain pitch higher harmonics of the main field of certain types may be eliminated. Others may still exist however, which cannot be eliminated since obviously a winding can only have one pitch, and these may give rise to E. M. F.'s in the commutating coil whose elimination may in certain cases justify special precautions. The existence of such E. M. F.'s in the coils other than the commutating coil is harmless and hence it is only in that coil that it is important to eliminate them. In such cases the pitch of the coil may be made equal to an even number of pole pitches of the alternating current winding and a short circuited turn placed on the stator (preferably of heavy section) as nearly as possible identical in position with the coil which is in process of commutation, and having a pitch equal to an even number of poles of the alternating field. Any harmonics due to the stator winding will revolve with respect to both stator and rotor and will be damped out at any rate opposite the commutating coil by the short circuited turn just mentioned, their existence at other points not being injurious. The stator winding itself may conveniently be connected so that for instance all the north poles of each phase are in parallel when it will itself tend to eliminate such harmonics.

A winding adapted to two and eight poles or any multiple of these is shown in Figure 9 for the case of twenty four slots. In this winding four bars $a$, $c$, $b$, and $d$ are connected in series and short circuited, bars $a$ and $c$ being diametrically opposite and also bars $b$ and $d$. Bars $a$ and $b$ may conveniently differ in position by about one eighth of the circumference but this exact value is not essential. There are six sets of such bars, the connections between pairs of bars forming a clip or knuckle, those at the commutator end being as in Figure 7. Alternate clips at the commutator end may be regarded as the "top" and "bottom" bars of a winding of the ordinary type and may be reconnected by means of a further set of end connections. The coil formed by the two bars $b$ and $c$ and that formed by the two bars $a$ and $d$ may have several turns instead of one only, all the coils being connected in pairs in series as shown.

When subjected to an eight pole field short-circuited currents will circulate through the bars $a$, $c$; $d$, $d$. When subjected to a two pole field, however, the E. M. F. in bars $a$, and $c$, $b$ and $d$ will be equal and opposite, and hence no current will circulate in the local circuit through the bars; but the connections between the pairs of coils will be at opposite potentials and can be joined to the commutator as shown.

Such a winding whose element consists of two coils connected in series in a closed circuit the two junction points of said coils being further connected as in a drum winding of normal type, can be adapted to any combination of pole numbers which when divided by their G. C. M. are the one odd and the other even.

If the coil formed by the bars $b$ and $c$ be reversed with respect to the coil $a$, $d$, the winding will be short-circuited on two poles and capable of connection to a commutator on eight poles.

Figure 10:
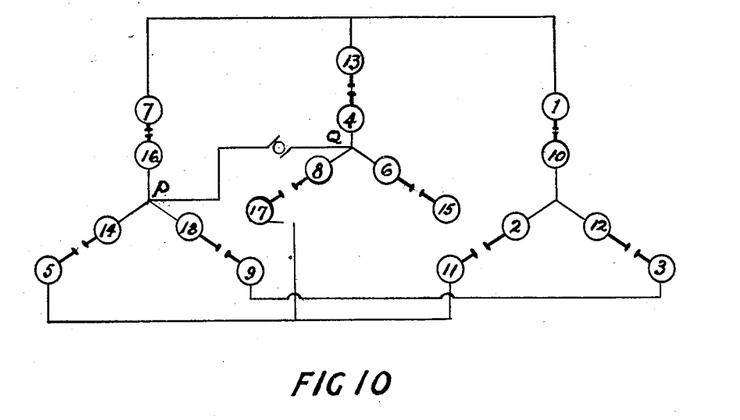
Figures 10, 11 and 12 are diagrams showing windings adapted to produce a certain pole number when supplied with alternating current and another pole number when a current requiring only two line wires is fed in at their star points at the same time as alternating current at their main terminals.
Figure 11:
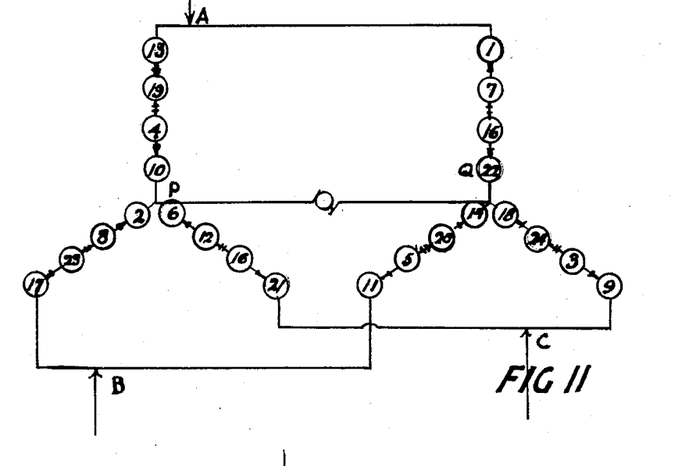
Figure 12:
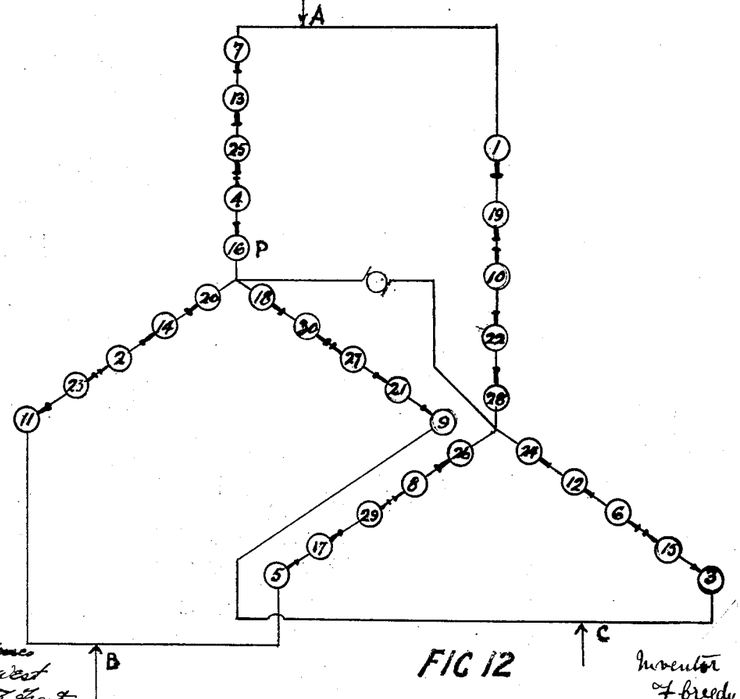

It will now be convenient to describe certain further stator windings adapted to produce a given pole number when supplied with polyphase alternating current and a second pole number when a second current requiring only two line wires is fed in at their star points. In Figures 10, 11, and 12 windings of this class are shown, the same diagrammatical method of indicating the sections of the winding being adopted as in my specification No. 1,563,474, for instance. That is, the sections are numbered consecutively round the circumference and the beginning of each section is indicated by a circle in which its number is inscribed. This is joined by a straight line to a smaller blackened circle which indicates the end of the section.

Figure 10 shows a winding in three parallels of the same type as that of which one phase is shown in Figure 17 of my specification No. 1,563,474. Such a winding if fed with three phase alternating current at the points A, B, C will produce a six pole field the alternating current flowing through all three parallels. If a second current requiring only two line wires be fed in at two of the star points for instance, P, Q, the pitch of the winding being made preferably intermediate between that corresponding to six poles and the two poles then this direct current will produce a two pole field.

Figure 11 indicates a winding arranged in two parallels so as to produce an eight pole field when three phase alternating current is fed in at the points A, B, C. If in a similar manner a second current requiring only two line wires is fed in at the two star points P and Q the winding will produce a two pole direct current field.

Figure 12 indicates a winding of same type in which alternating current is fed in at the points A, B, C and produces a ten pole field, while a second current requiring only two line wires fed in at the points P, Q produces a four pole field.

I have discovered that by connecting the windings in two or more parallels between two of which a second current requiring only two line wires flows it is possible to arrange a winding of this type for any combination of pole numbers. Such a winding can always be arranged with only two parallels where the number of pole pairs divided by their G. C. M. are the one odd and the other even.

Figure 13:
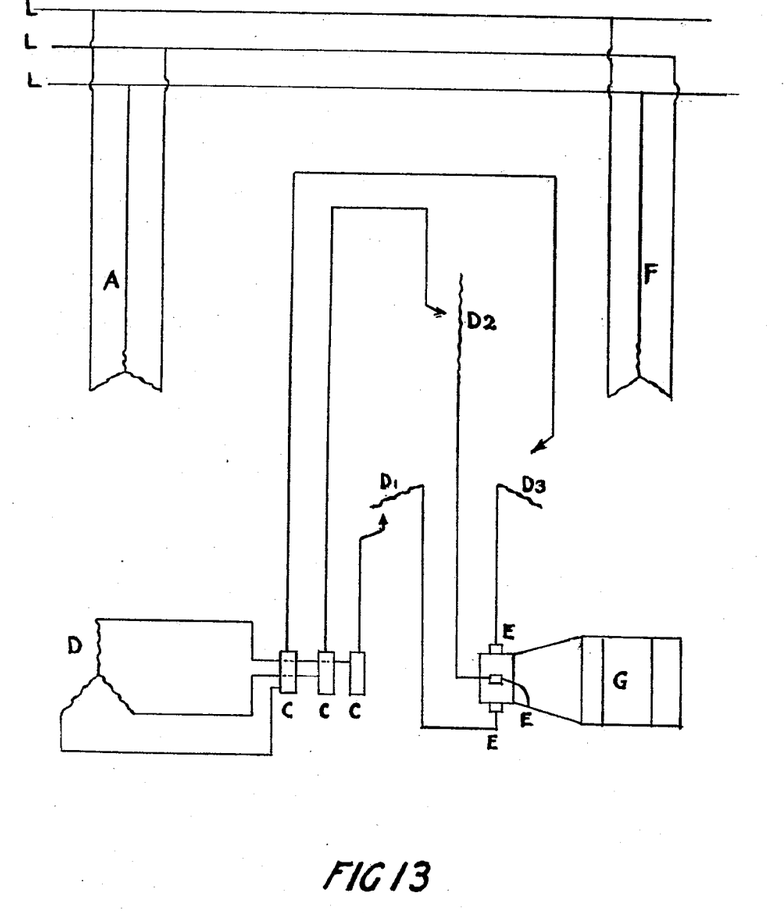
Figure 13 shows a case in which a machine is used in cascade with a main induction motor.

It has been pointed out that the winding of Figure 3 may be regarded as a two phase winding the heavy lines belonging to one phase and the light lines to the other. In this case of course a two phase distribution of brushes must be placed on the commutator, and the windings distributed as in Figure 3 connected in series with these brushes the six pole element of the machine being a polyphase series machine. Such a set of small size may be connected in series with the slip rings of a larger machine and will serve to transform the low frequency power flowing from them, and feed it back to the supply in a manner already known where two distinct machines are employed. In Figure 13, for instance, is shown how such an apparatus may be used for the speed regulation of a large induction motor. In this figure the three phase winding A may represent the primary winding of the large induction motor, while B represents its secondary winding attached to slip rings C, C, C. The primary winding of the converter is shown at F and the armature at G.

On the commutator of this armature rests three brushes E, E, E, which are connected in series with a three phase stator winding $D^1$, $D^2$, $D^3$. This in its turn is connected to the slip rings, regulation being effected, for instance, by varying the number of turns on the winding $D^1$, $D^2$, $D^3$, this operation being indicated by the movable arrow heads shown in the figure.

When such a large induction motor is controlled in this way and is run below synchronism, it will supply power to the commutator through the stator winding $D^1$, $D^2$, $D^3$, this winding and the appropriate circuits on the rotor G forming a polyphase commutator motor. This commutator motor drives an induction generator which returns power to the line, and which is formed from the stator winding F and the remaining circuits on the rotor G. When the large induction motor is operated above synchronism it takes power from the commutator of the converter which operates as a three phase commutator generator as an induction motor. These methods of regulation of a large induction motor are already well known in the case where the conversion of the slip power is made by means of two machines. The advantage attained by the use of the present invention is the substitution of one machine for two machines, and in fact a machine according to the invention may take the place of any type of motor generator set whatever leading to great economy by the elimination of one machine.

By making suitable variations in the windings following the principles already described, it will be evident that the commutator portion of the set may be arranged for any known type of alternating current commutator apparatus, which may be used either for phase compensation or speed variation or for any other purpose.

Such polyphase machines find many applications, for instance, if the set contains two rotor windings, one attached to the commutator and the other to the slip rings, the said slip rings may be connected direct to such a commutator machine leading to a similar economy by the elimination of one machine.

What I claim is:—

1. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, and the other part of the winding on the rotor constituted by sets of conductors spaced apart by an even number of pole pitches of the second field and connected in series in a closed circuit.

2. A dynamo-electric machine comprising a stator, a winding on the stator, a rotor, a compound winding on the rotor, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, and the other part of the winding on the rotor constituted by sets of conductors spaced apart by an even number of pole pitches of the second field and connected in series in a closed circuit.

3. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, the field of the one pole number generating no E. M. F.'s between the segments of the commutator, and the other part of the winding on the rotor constituted by sets of conductors spaced apart by an even number of pole pitches of the second field and connected in series in a closed circuit.

4. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator and the other part of the winding on the rotor constituted by a number of sets of evenly spaced coils spaced apart by an even number of pole pitches of the stator field of the second pole number and connected in series in a closed circuit.

5. A dynamo-electric machine comprising a stator, a winding on the stator, a rotor, a compound winding on the rotor, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, and the other part of the winding on the rotor constituted by a number of sets of evenly spaced coils spaced apart by an even number of pole pitches of the stator field of the second pole number and connected in series in a closed circuit.

6. A dynamo-electric machine comprising a stator, a winding on the stator, a rotor, a winding on the rotor in two parts, a commutator, one part of the said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, the other part of the winding on the rotor constituted by sets of conductors spaced apart by an even number of pole pitches of the second field and connected in series in a closed circuit and short circuited coils on the stator having a pitch equal to an even number of pole pitches of the first field disposed in close proximity to the coils on the rotor undergoing commutation.

7. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, the field of the one pole number generating no E. M. F.'s between the segments of the commutator, the other part of the winding on the rotor constituted by sets of conductors spaced apart by an even number of pole pitches of the second field and connected in series in a closed circuit and short circuited coils on the stator having a pitch equal to an even number of pole pitches of the first field disposed in close proximity to the coils on the rotor undergoing commutation.

8. A dynamo-electric machine comprising a stator, a winding on the stator, a rotor, a winding on the rotor in two parts, a commutator, one part of said rotor winding connected thereto, brushes on the commutator, the winding on the stator comprising a plurality of star connected parts producing a field of one pole number energized from an alternating current supply, a field of a second pole number energized from a second supply connected between the star points, the said winding producing ampere turns substantially equal and opposite to those produced in the rotor by the current flowing through the commutator, said pole numbers differing by more than three, the second stator field inducing E. M. F.'s across the brushes on the commutator and the other part of the winding on the rotor constituted by sets of conductors spaced apart by an even number of pole pitches of the second field and connected in series in a closed circuit.

9. A dynamo-electric machine comprising a stator, a winding on the stator, a rotor, a compound winding on the rotor, a commutator, one part of said rotor winding connected thereto, brushes on the commutator, the winding on the stator comprising a plurality of star connected parts producing a field of one pole number energized from an alternating current supply, a field of a second pole number energized from a second supply connected between the star points, the said winding producing ampere turns substantially equal and opposite to those produced in the rotor by the current flowing through the commutator said pole numbers differing by more than three, the second stator field inducing E. M. F.'s across the brushes on the commutator and the other part of the winding on the rotor constituted by sets of conductors spaced apart by an even number of pole pitches of the second field and connected in series in a closed circuit.

10. A dynamo-electric machine comprising a stator, a winding on the stator in two parts, a rotor, a winding on the rotor in two parts, a commutator, one part of said rotor winding connected thereto, brushes on the commutator, one part of the winding on the stator comprising a plurality of star connected parts producing a field of one pole number energized from an alternating current supply, a field of a second pole number energized from a second supply connected between the star points and the other part of said winding producing a field of said second pole number energized from a second supply, one of said parts of said second pole number producing ampere turns substantially equal and opposite to those produced in the rotor by the current flowing through the commutator, said pole numbers differing by more than three, the second stator field inducing E. M. F.'s across the brushes on the commutator and the other part of the winding on the rotor constituted by sets of conductors spaced apart by an even number of pole pitches of the second field and connected in series in a closed circuit.

11. A dynamo-electric machine comprising a stator, a winding on the stator in two parts, a rotor, a winding on the rotor in two parts, a commutator, one part of said rotor winding connected thereto, brushes on the commutator, one part of the winding on the stator comprising a plurality of star connected parts producing a field of one pole number energized from an alternating current supply, a field of a second pole number energized from a second supply connected between the star points and the other part of said winding producing a field of said second pole number energized from a second supply, one of said parts of said second pole number producing ampere turns substantially equal and opposite to those produced in the rotor by the current flowing through the commutator, said pole numbers differing by more than three, the second stator field inducing E. M. F.'s across the brushes on the commutator, the other part of the winding on the rotor constituted by sets of conductors spaced apart by an even number of pole pitches of the second field and connected in series in a closed circuit and short circuited coils on the stator disposed in close proximity to the coils on the rotor undergoing commutation.

12. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second supply, the said winding producing ampere turns substantially equal and opposite to those produced in the rotor by the current flowing through the commutator, said pole numbers differing by more than three, the stator field of the second pole number inducing E. M. F.'s across the brushes on the commutator, the other part of the winding on the rotor constituted by sets of conductors spaced apart by an even number of pole pitches of the second field and connected in series in a closed circuit and in which there is no electrical connection between the commutator circuits and any of the windings contained in the same slots as the windings producing the field of the one pole number.

13. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second alternating current supply, the said winding producing ampere turns substantially equal and opposite to those produced in the rotor by the current flowing through the commutator, said pole numbers differing by more than three, the stator field of the second pole number inducing E. M. F.'s across the brushes on the commutator, and the other part of the winding on the rotor constituted by sets of conductors spaced apart by an even number of pole pitches of the second field and connected in series in a closed circuit.

14. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second alternating current supply, the said winding producing ampere turns substantially equal and opposite to those produced in the rotor by the current flowing through the commutator, said pole numbers differing by more than three, the stator field of the second pole number inducing E. M. F.'s across the brushes on the commutator, the field of the one pole number generating no E. M. F.'s between the segments of the commutator, and the other part of the winding on the rotor constituted by sets of conductors spaced apart by an even number of pole pitches of the second field and connected in series in a closed circuit.

15. A dynamo-electric machine comprising a stator, a winding on the stator, a rotor, a winding on the rotor in two parts, a commutator, one part of said rotor winding connected thereto, brushes on the commutator, the winding on the stator producing a field of one pole number energized from an alternating current supply and a field of a second pole number energized from a second alternating current supply, the said winding producing ampere turns substantially equal and opposite to those produced in the rotor by the current flowing through the commutator, said pole numbers differing by more than three, the stator field of the second pole number inducing E. M. F.'s across the brushes on the commutator, the other part of the winding on the rotor constituted by sets of conductors spaced apart by an even number of pole pitches of the second field and connected in series in a closed circuit and in which there is no electrical connection between the commutator circuits and any of the windings contained in the same slots as the windings producing the field of the one pole number.

16. A dynamo-electric machine comprising a stator, a winding on the stator, a rotor, a winding on the rotor in two parts, a commutator, one part of said rotor winding connected thereto, brushes on the commutator, the winding on the stator comprising a plurality of star connected parts producing a field of one pole number energized from an alternating current supply, a field of a second pole number energized from a second alternating current supply connected between the star points, the said winding producing ampere turns substantially equal and opposite to those produced in the rotor by the current flowing through the commutator, said pole numbers differing by more than three, the second stator field inducing E. M. F.'s across the brushes on the commutator and the other part of the winding on the rotor constituted by sets of conductors spaced apart by an even number of pole pitches of the second field and connected in series in a closed circuit.

Dated this 29th day of October, 1925.

FREDERICK CREEDY.